Patented Aug. 7, 1928.

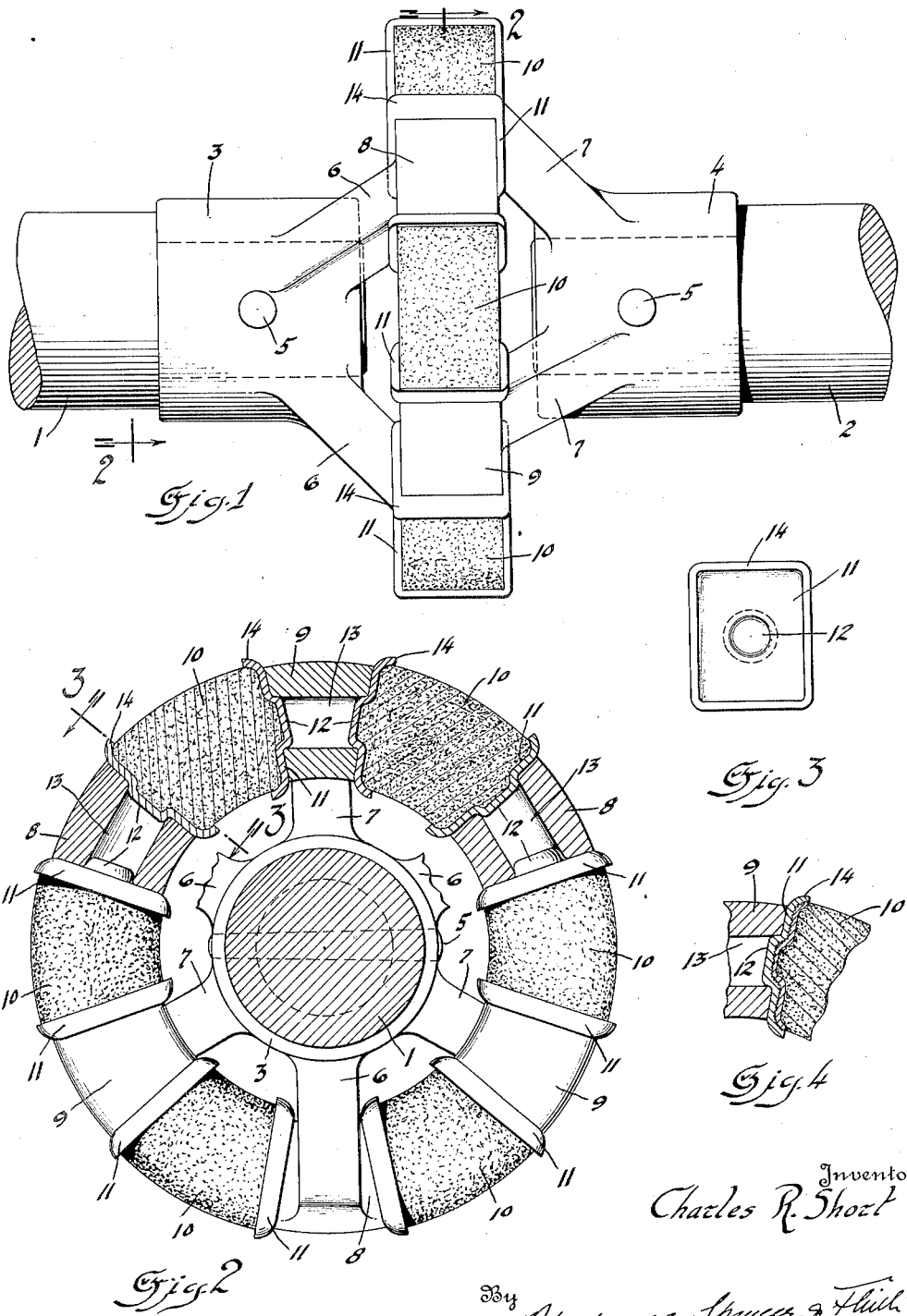

1,679,992

UNITED STATES PATENT OFFICE.

CHARLES R. SHORT, OF DETROIT, MICHIGAN, ASSIGNOR TO GENERAL MOTORS RESEARCH CORPORATION, OF DETROIT, MICHIGAN, A CORPORATION OF DELAWARE.

UNIVERSAL JOINT WITH RUBBER INSERTS.

Application filed February 23, 1927. Serial No. 170,383.

This invention relates to flexible couplings for transmitting rotary motion between shafts, and is particularly adaptable for use as a universal connection for propeller shafts of motor vehicles and the like, which are subjected almost constantly to severe shocks and strains.

The object of the invention is to provide a connection between a driving member and a driven member, embodying non-metallic elastic material, which will permit variations in alignment of the shafts, yield to slight relative movement between the shaft sections, and at the same time insulate the sections one from another. Thus the flexible coupling cushions torque reactions and stresses incident to changes in speeds, absorbs and prevents the transmission of vibrations from one section to another, thereby obviating disagreeable vibratory noises, and furthermore, the coupling cuts down wear and breakage of parts and eliminates problems of lubrication.

Other objects and advantages will be apparent from the following specification, taken in connection with the accompanying drawing of a preferred embodiment of the invention, wherein Figure 1 is an elevation of the present coupling interposed between adjacent ends of two shaft sections; Figure 2 is a sectional view on line 2—2 of Figure 1; Figure 3 is a detail face view of one of the retaining cups for the elastic material being taken on the line 3—3 of Figure 2; and Figure 4 is a detail sectional view of a slight modification.

Referring to the drawing, the reference characters 1 and 2 indicate shaft sections to be coupled, either of which may be considered the driving or the driven member. A pair of spider members are secured to adjacent ends of the shaft sections, the hubs 3 and 4 of the spider members being fitted over and fastened respectively to reduced portions of the shafts by a pin 5.

Any suitable number of spider arms may be provided. In the drawing, there are shown three arms projecting outwardly from each hub, those on the hub 3 being indicated at 6 and those on the hub 4 by the numeral 7. The spider arms secured to one shaft alternate with those of the other shaft, and at their outer ends carry sector shaped heads 8 and 9 respectively, which heads are arranged in annular relation and have converging sides located on lines radiating from a common center.

Interposed between the alternating sectors of the driving and driven members are located resilient sector-shaped members, forming with said heads, an annular ring, for transmitting rotary motion from one shaft to the other. The interposed sectors consist principally of blocks of non-metallic elastic cushioning material 10, such as rubber or other suitable substance of the same general characteristics, which are detachably held between the radial faces of the heads 8 and 9 by oppositely disposed retainers 11. The retainers 11 are preferably stamped from sheet metal into cup-shape, with projections or bosses 12 on the backs thereof, for insertion into openings, such as the hole 13 extending transversely through the sector heads. The coupling may thus be easily and quickly assembled or replacements of cushioning elements readily made. The overhanging marginal flanges 14 of the cup-shaped retainers, securely hold the block 10 against accidental dislodgment, due either to centrifugal action or otherwise. As a further precaution, the elastic block 10 may be fixedly united with the retainers by vulcanization or the like, or in lieu of such integral union, the interior surface of the retainer may be roughened, as shown in Figure 4 and the abutting face of the block made less elastic or tougher than the intermediate portion, to increase frictional resistance to accidental dislocation.

From the above description it will be seen that the cushioning blocks are capable of ready deformation to resistantly yield and permit slight relative movement between the shafts for cushioning the torque reactions and further serve to insulate the shaft sections from each other thereby dampening vibrations and noises.

While the invention has been described more or less specifically, it is to be understood that it is not limited to the exact details, but that such obvious modifications may be made as come within the scope of the appended claims.

Having thus described the invention, I claim:

1. Means to flexibly couple a pair of shafts including spider arms fixed to adjacent ends of shafts to be coupled, the arms on one shaft alternating with those on the other, and resilient elements interposed between said arms consisting of blocks of non-metallic elastic material, the intermediate portions of the blocks being of greater elasticity than the end portions, and retaining members for said blocks having portions for attachment with said arms and having roughened surfaces in engagement with said end portions of the blocks to hold the blocks in place.

2. Means to flexibly couple a pair of shaft sections for transmission of rotary motion from one section to the other, including spider arms fixed to the adjacent ends of the shaft sections and carrying sector-shaped portions arranged in annular relation, the arms of one section alternating with those of the other section and sector-shaped torque cushioning elements interposed between said sector-shaped portions of the several arms, and forming therewith a complete annulus, said cushioning elements each consisting of a pair of oppositely disposed cup-shaped members, each having a boss on the back thereof for engagement within an opening in the adjacent face of a sector portion of an arm, and being further provided with a rough interior surface, and a block of non-metallic elastic material contained between said cups, and engaged by said roughened surfaces, the material adjacent the cups being of less elasticity than the intermediate portion.

3. A universal joint for coupling a pair of shafts, including a pair of spider members to be carried by the shafts, each spider member comprising a hub secured on the end of a shaft and a plurality of radial arms extending obliquely toward corresponding arms of the other spider member, and enlarged sector-shaped heads carried at the extremities of said arms, the heads of one member being arranged in alternate relation with those of the other member, sector shaped resilient elements interposed between succeeding heads of the spider members, a pair of retainer cups provided for each resilient element and engageable with opposite ends of the element, and bosses formed on the backs of the respective cups adapted for anchorage within openings in adjacent faces of said heads.

4. A universal joint for coupling a pair of shafts, including a pair of spider members to be carried by the shafts, each spider member comprising a hub secured on the end of a shaft and a plurality of radial arms extending obliquely toward corresponding arms of the other spider member, the arms of the respective spider members being arranged in alternate relation, and each arm having a transverse opening extending therethru adjacent the outer end thereof, blocks of resilient cushioning material interposed between succeeding arms and retainer cups engaging the ends of said blocks and having projections on the backs thereof for engagement within the openings in said arms to hold the cushioning blocks in place.

In testimony whereof I affix my signature.

CHARLES R. SHORT